United States Patent [19]

Cherrette et al.

[11] Patent Number: 4,717,919

[45] Date of Patent: Jan. 5, 1988

[54] FEEDBACK LIMITED ADAPTIVE ANTENNA WITH SIGNAL ENVIRONMENT POWER LEVEL COMPENSATION

[75] Inventors: Alan R. Cherrette, Hawthorne; Donald C. D. Chang, Torrance, both of Calif.

[73] Assignee: Hughes Aircraft Company, Los Angeles, Calif.

[21] Appl. No.: 737,767

[22] Filed: May 28, 1985

[51] Int. Cl.[4] ............................ G01S 3/16; G01S 3/28
[52] U.S. Cl. ..................................... 342/383; 342/380; 342/378
[58] Field of Search ................. 343/383; 342/368, 376, 342/377, 378, 379, 380, 383

[56] References Cited

U.S. PATENT DOCUMENTS

| | | | |
|---|---|---|---|
| 3,876,947 | 4/1975 | Giraudon | 343/383 X |
| 4,032,922 | 6/1977 | Provencher . | |
| 4,070,675 | 1/1978 | Daniel et al. | 343/380 |
| 4,079,379 | 3/1978 | Piesinger | 343/383 X |
| 4,079,380 | 3/1978 | Esry et al. . | |
| 4,086,592 | 4/1978 | Lewis et al. | 343/381 |
| 4,204,211 | 5/1980 | Cavelos . | |
| 4,255,791 | 3/1981 | Martin . | |
| 4,268,829 | 5/1981 | Baurle et al. | 343/381 X |
| 4,280,128 | 7/1981 | Masak . | |
| 4,367,472 | 1/1983 | Hauptmann et al. | 343/383 X |

OTHER PUBLICATIONS

L. E. Brennan et al., "Effect of Envelope Limiting in Adaptive Array Control Loops", IEEE Trans. on Aero & Elec. Sys., Jul. 1971, pp. 698–700.
F. W. Floyd et al., "Some Effects of Hard Limiting in Adaptive Antenna Systems", IEEE Trans. on Aero & Elec. Sys., Nov. 1980, pp. 839–850.
D. C. D. Chang et al., "Limiter Effects on Adaptive Array Systems", IEEE 1982 Int'l. Symposium on Antennas & Propagation Digest, May 1982, pp. 711–714.
"Adaptive Antenna Systems", B. Widrow, et al., Proceedings of the IEEE, vol. 55, No. 12, Dec. 1967, pp. 2143–2158.
"Adaptive Nulling with Multiple-Beam Antennas", Joseph T. Mayhan, IEEE Transactions on Antennas and Propagation, vol. AP-26, No. 2, Mar. 1978, pp. 267–273.
"Adaptive Arrays-An Introduction", William F. Gabriel, Proceedings of the IEEE, vol. 64, No. 2, Feb. 1976, pp. 239–272.

Primary Examiner—Theodore M. Blum
Assistant Examiner—John B. Sotomayor
Attorney, Agent, or Firm—S. M. Mitchell; M. J. Meltzer; A. W. Karambelas

[57] ABSTRACT

An adaptive antenna comprising at least two sensors for receiving electromagnetic signals and for producing first signals; the antenna further including divider means for dividing each first signal into respective second and third signals; weighting means for modifying each respective second signal according to a quantized weighting function; summing means for summing the respective second signals to provide a fourth signal; means for producing a system feedback signal in response to the fourth signal; limiter means for limiting the dynamic range of the system feedback signal; correlator means for correlating the respective third signals with the limited system feedback signal to produce respective correlator output signals; means for determining the signal environment power level of the far field sensed by the at least two sensors and for providing a fifth signal substantially corresponding to $1/\sqrt{P}$, where P is the signal power level incident on the adaptive array; and means for modifying the weighting function based upon the correlator output signals and the fifth signal.

14 Claims, 3 Drawing Figures

FEEDBACK LIMITED ADAPTIVE ANTENNA WITH SIGNAL ENVIRONMENT POWER LEVEL COMPENSATION

BACKGROUND OF THE INVENTION

1. Field of the Invention

The present invention relates to adaptive antennas and more particularly to adaptive antennas employing steepest descent algorithms.

2. Description of the Related Art

Antennas are used to receive signals for imaging, communications and other purposes. Conventional antennas are susceptible to degradation in signal to noise ratio (SNR) performance due to undesired "noise" which intrudes via antenna sidelobes and mainlobes. The noise may comprise deliberate electronic countermeasures, friendly radio frequency interference, clutter scatter returns or natural noise sources. Adaptive antennas typically steer nulls onto undesired sources of interference, thereby enhancing SNR and improving the detection of desired signals.

A typical adaptive antenna using a steepest descent algorithm, such as the Applebaum or least mean square error (LMS) algorithms, includes a plurality of antenna elements. In practice, each antenna element receives signals from the signal environment. The received signals may include undesired interfering signals which degrade SNR. The received antenna element signals are weighted, and the weighted antenna element signals are summed to provide an antenna output signal. The adaptation process involves changing the weights applied to the various antenna element signals such that they substantially converge to an optimal set of weights whereupon interfering signals add substantially destructively and the desired signals add substantially coherently. Thus, ideally, nulls will be formed in the directions of undesired interfering signals.

For example, one particular type of adaptive antenna divides signals received by each antenna element into first signals to be processed and second signals to be left substantially unprocessed. Processing of the first signals ordinarily includes weighting of each of the first signals and summing the weighted signals to provide an antenna output signal. An error signal is generated based upon the difference between the antenna output signal and a desired signal. The desired signal is a signal having a selected center frequency and bandwidth in a particular time interval. For each antenna element, the corresponding substantially unprocessed second signal and the error signal are provided to a respective correlator which provides a respective correlation signal which is inputted to a computer. The computer uses information regarding the correlation of the respective second signals and the error signal in executing a steepest descent algorithm which adjusts the weights to be applied to the first signals.

While adaptive antennas employing steepest descent algorithms generally have been successful, there have been shortcomings with their use. For example, B. Widrow, et al in "Adaptive Antenna Systems", *Proceedings of the IEEE*, Volume 55, No. 12, December 1967, pages 2143-2159, demonstrated that, ordinarily, for fixed signal environment power levels, there was an upper bound on the power level for which an adaptive antenna using an LMS algorithm would efficiently cause the weights to converge to an optimum set of values.

Furthermore, adaptive antennas often are implemented in a digital system in which the weights applied to the first signals are quantized. The quantization of the weights involves allowing the weights to take on only a discreet set of values. Some advantages of digital adaptive antennas are programmability, temperature insensitivity, and ease of implementation. Unfortunately, quantization of the weights can decrease the efficiency of a steepest descent algorithm executed by the adaptive antenna by inducing a lower bound on the signal environment power level for which the algorithm will efficiently cause the weights to substantially converge to an optimum set of values.

Thus, there has been a need for a digitally implemented adaptive antenna employing a steepest descent algorithm in which the weights determined by the algorithm can be quantized without a resultant reduction in the range of signal environment power levels for which the algorithm efficiently substantially adjusts the weights to an optimum set of values. The present invention meets this need.

SUMMARY OF THE INVENTION

In one embodiment, the present invention provides an adaptive antenna comprising at least two sensors for receiving electromagnetic signals from a far field and for producing respective first signals. An adaptive antenna comprising the invention includes a divider for dividing each first signal into respective second and third signals. Weighting circuitry is provided for modifying each respective second signal according to a quantized weighting function. A summing circuit is provided for summing the modified second signals to provide a fourth signal. Circuitry is included for providing a system feedback signal in response to the fourth signal. The adaptive antenna includes a limiter for limiting the dynamic range of the system feedback signal and circuitry for correlating the respective third signals with the limited system feedback signal to produce a correlator output signal. Circuitry also is included for determining the total signal environment power of the far field sensed by said at least two sensors and for providing a fifth signal substantially corresponding to $1/\sqrt{P}$, where P is proportional to the total signal environment power of the far field. Circuitry is included for modifying the weighting function based upon the correlator output signals and the fifth signal.

Furthermore, the present invention comprises a method for adaptive receiving of electromagnetic signals providing for the substantial cancellation of interfering signals, including the steps of detecting electromagnetic signals and producing at least two first signals having relative phase and amplitude relationships dependent upon the direction of sources of detected signals. The method further includes the step of dividing the first signals into respective second and third signals. The second signals are modified according to a quantized weighting function, and the modified second signals are summed to provide a fourth signal. A system feedback signal is produced based upon the fourth signal. The dynamic range of the system feedback signal is limited, and the limited system feedback signal and the third signals are correlated. The signal environment power level of a far field encompassing the detected signals is determined, and a fifth signal is provided which substantially corresponds to $1/\sqrt{P}$, where P is proportional to the total total signal environment power in the far field. The weighting function is modified based upon the correlation of the limited feedback signal and the third signals and on the fifth signal.

The adaptive antenna and the method of the present invention advantageously permit the adjustment of quantized weights by a steepest descent algorithm to provide an antenna coverage pattern in which nulls are pointed in the directions of interfering sources. The new antenna and method cause the weights to substantially converge to an optimum set of values substantially independently of the signal environment power level. Thus, the dynamic range of signal environment power levels at which the adaptive antenna and the method of the present invention satisfactorily perform is significantly increased.

These and other features and advantages of the present invention will become more apparent from the following more detailed description of an exemplary embodiment thereof, as illustrated in the accompanying drawings.

BRIEF DESCRIPTION OF THE DRAWING

The purpose and advantages of the present invention will be apparent to those skilled in the art from the following detailed description in conjunction with the appended drawings in which.

DESCRIPTION OF THE PREFERRED EMBODIMENTS

The present invention provides a novel adaptive antenna and an associated adaptive method for receiving electromagnetic signals. The following description is presented to enable any person skilled in the art to make and use the invention, and is presented in the context of a particular application and its requirements. Various modifications and improvements to the preferred embodiment will be readily apparent to those skilled in the art, and the generic principles herein may be applied to other embodiments and applications. Thus, the present invention is not intended to be limited to the embodiment shown, but it is to be accorded the widest scope consistent with the principles and features disclosed herein.

Figure 1:
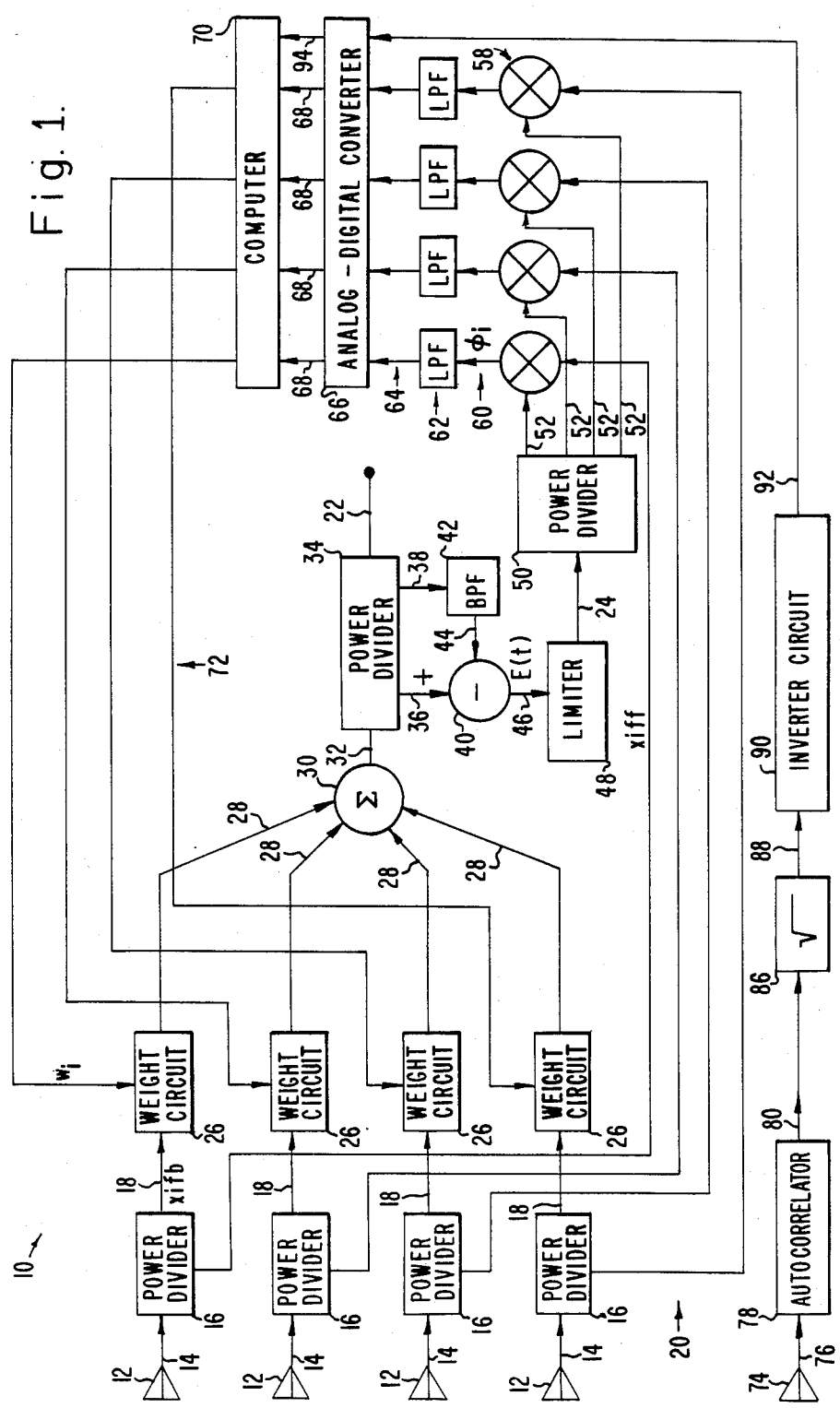
FIG. 1 is a schematic diagram of a first adaptive antenna in accordance with the present invention.

Referring to the exemplary drawings of FIG. 1, a first embodiment 10 of an adaptive antenna of the present invention is shown. The first embodiment 10 includes an array of four first antenna elements 12 which receive electromagnetic signals from the signal environment and convert those signals into four corresponding first signals on respective corresponding lines 14. The first antenna elements 12 detect signals emanating from the far field of the adaptive antenna. The relative phases and amplitudes of the first signals substantially depend upon the direction of the sources of the received signals relative to the first antenna elements 12. The coverage pattern of the adaptive antenna is adapted by processing the first signals to substantially point nulls in the directions of interfering sources. The four first antenna elements 12, for example, may comprise a phased array.

The first signals on lines 14 produced by the respective first antenna elements 12 are provided to respective first power dividers 16 which divide the first signals between second signals on lines 18 and third signals on lines 20. As will be described in more detail hereinafter, the second signals on lines 18 are processed to provide an output signal on line 22, representing the antenna coverage pattern, and to provide a system feedback signal on line 46. The third signals on lines 20 comprise diagnostic feedforward signals which, together with the system feedback signal, are used to adjust the processing of the second signals and to thereby adapt the coverage pattern of the adaptive antenna.

The second signals on lines 18 are provided to respective weighting circuits 26. Each of the weighting circuits 26 weights the amplitude and phase of an associated second signal. Four weighted second signals corresponding to the four respective antenna elements 12 are provided on respective lines 28 to a summing circuit 30 which sums the weighted second signals and provides a fourth signal corresponding to the sum on line 32.

The fourth signal on line 32 is provided to a power divider 34 which divides the signal into the antenna output signal on line 22 and first and second substantially equivalent feedback signals on lines 36 and 38, respectively. The first feedback signal is provided to a subtraction circuit 40. The second feedback signal is provided to a bandpass filter 42 which substantially removes from the second feedback signal electromagnetic energy outside a desired frequency band and provides the energy within the desired frequency band to the subtraction circuit 40 as a signal on line 44. The subtraction circuit 40 substracts the bandpass filter signal representing the desired frequency band on line 44 from the first feedback signal on line 36 to provide the system feedback signal on line 46.

One skilled in the art will appreciate that the output signal on line 22 substantially represents the coverage pattern of the adaptive antenna of the first embodiment 10 at each instant in time. Furthermore, he will understand that the weights applied to the various second signals by the weighting circuits 26 substantially determine which signals will be added substantially coherently and which will be added substantially destructively by the summing circuit 30 to produce the antenna output signal on line 22. Finally, he will appreciate that the system feedback signal on line 46 represents an error signal substantially characterizing, at any point in time, the difference between a desired band of frequencies to be received and the actual band of frequencies received which includes frequencies corresponding to interfering sources. It will be appreciated that the desired band of frequencies can be a function of time.

The system feedback signal is correlated with the diagnostic feedforward third signals, in a manner which will be desribed in more detail hereinafter, to adjust the weights to cause the adaptive antenna to substantially adjust its coverage pattern to substantially point nulls in the directions of interfering sources. The weights can be adjusted to adapt the coverage pattern as the relative directions of intefering sources change, for example, due to movement of the adaptive antenna or to movement of the interfering sources or to the appearance or disappearance of various interfering sources.

The system feedback signal on line 46 is provided to a limiter 48. The limiter 48 preferably is a hard limiter circuit which substantially prevents signal amplitude from exceeding a value relatively close to the level of the desired signal. The limiter 48 provides a limited system feedback signal on line 24 to a power divider 50 which divides the limited system feedback signal into four substantially equivalent divided limited system feedback signals on four respective lines 52.

The adaptive antenna of the first embodiment 10 includes four multiplier circuits 58. Each multiplier circuit is operatively connected to one of the four lines 52 carrying a divided limited system feedback signals and to one of the four lines 20 carrying a third signal. Each multiplier circuit 58 generates an output signal which is the product of its two input signals. The output signals of the multiplier circuits 58 are provided on four respective lines 60 to four respective low pass filters 62 which substantially filter out high frequency components of the multiplier output signals. The filtered signals provided by the low pass filters 62 represent the correlation of the respective diagnostic feedforward third signals and with respective divided limited system feedback signals.

The four low pass filters 62 provide four respective correlation signals on four respective lines 64 to an analog to digital converter 66. The analog to digital converter 66 converts the four analog correlation signals on lines 64 to corresponding digital correlation signals on four respective lines 68. One skilled in the art will appreciate that a correlation signal must be in digital form if the adaptive algorithm is to be performed by a digital computer.

A second antenna element 74 senses electromagnetic energy from substantially the entire far field sensed by the four first antenna elements 12 and provides a signal on line 76 which corresponds to the total electromagnetic signal power of the far field sensed by the first antenna elements 12. The signal on line 76 is provided to an autocorrelator 78 which provides a signal on line 80 corresponding to a low pass filtered version of the square of the signal on line 76. One skilled in the art will appreciate that a voltage signal on line 76 is proportional to the total electromagnetic signal power. More specifically, the signal on line 76 is proportional to the signal power level of the far field sensed by the first antenna elements 12. The signal on line 80 is provided to a square root circuit 86. The square root circuit 86 provides a signal on line 88 which corresponds to the square root of the signal on line 80. The signal on line 88 is provided to an inverter circuit 90 which provides a signal on line 92 corresponding to the multiplicative inverse of the square root signal on line 88. The inverse signal on line 92 is provided to the analog to digital converter 66 which converts the inverse signal on line 92 to a corresponding digital inverse signal on line 94.

The analog to digital converter 66 provides the digital correlation signals on respective lines 68 and the digital inverse signal on line 94 to a digital computer 70, which executes an LMS algorithm using information provided by the digital correlation signals and the inverse signal, to modify the weights applied by the variable weight circuits 26. The digital computer 70 provides respective signals on four respective lines 72 to the four variable weight circuits 26. The signals provided by the digital computer 70 represent the adjusted weights to be applied to future second signals by the respective variable weight circuits 26.

One skilled in the art will appreciate that the computer output signals are quantized. The signals processed by the digital computer 70 take on only discrete sets of values. Therefore, one will appreciate that the variable weight circuits 26 controlled by the computer 70 may take on only a discrete set of states corresponding to the discrete or quantized set of values generated by the computer 70.

Figure 2:
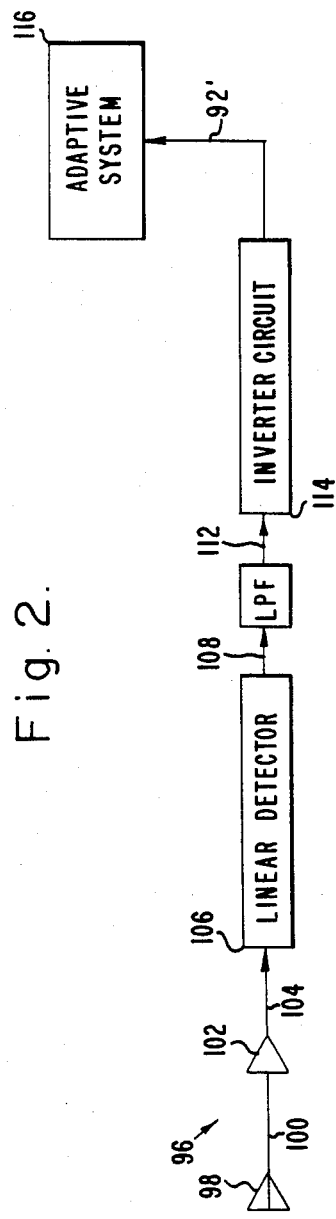
FIG. 2 is a schematic diagram of a second adaptive antenna in accordance with the present invention.

In a second embodiment 96 illustrated in the exemplary drawings of FIG. 2, a second antenna element 98 senses electromagnetic energy from substantially the entire far field sensed by the first antenna elements (not shown) and provides a signal on line 100. The second antenna element 98 is substantially similar to the second antenna element 74 of the first embodiment 10. The signal on line 100 is provided to an amplifier 102 which provides an amplified signal on line 104 to a linear detector 106 which provides a one-half wave rectified signal on line 108. The rectified signal on line 108 is provided to a low pass filter 110 which substantially filters out high frequency components of the rectified signal and provides a dc component on line 112.

One skilled in the art will appreciate that the dc component of the half-wave rectified signal provided on line 112 is proportional to the amplitude of the total electromagnetic energy incident on the first antenna elements (not shown). Since this amplitude is proportional to the square root of the power level of the far field sensed by the first antenna elements (not shown), the dc component provided on line 112 is proportional to the square root of total incoming signal power.

The filtered signal on line 112 is provided to an inverter circuit 114 which provides a signal on line 92' corresponding to the inverse of the signal on line 112. One will appreciate that the inverse signal on line 92' corresponds to the inverse signal on line 92 of the first embodiment 10. The inverse signal on line 92' is provided to an adaptive system 116 which is substantially identical to the system to which the inverse signal on line 92 of the first embodiment 10 is provided.

Thus, the second embodiment 96 substantially differs from the first embodiment 10 only in the manner in which it processes signals corresponding to the signal environment power level to provide a signal substantially proportional to the inverse of the square root of the signal environment power level. The adaptive system 116 of the second embodiment 96, therefore, may be described by reference to FIG. 1 and the corresponding description above. One skilled in the art will appreciate that the second embodiment might be preferable for higher signal power levels.

One particular advantage achieved by the adaptive antennas of the first and second embodiments 10 and 96 is gained by including the limiter 48 in a feedback loop and by using the inverse signal derived from the signal environment by the respective second antenna elements 74 and 98. Together, they substantially increase the dynamic range of signal environment power levels over which the adaptive antenna will efficiently adjust the respective quantized weights to substantially converge to an optimum set of values which result in an antenna coverage pattern which substantially points nulls in the directions of interfering sources.

The following discussion regarding the application of the LMS algorithm in the adaptive antennas of the first and second embodiments 10 and 96 explains the role of the limiter 48 and the respective second antenna elements 74 and 98 in improving the performance of the adaptive antennas over a relatively wide range of signal environment power levels.

A steepest descent algorithm of the LMS type takes the following general form for an adaptive antenna having N antenna elements 12 and N corresponding first signal channels:

$$W_i(k+1) = W_i(k) - \mu \phi_i(k) \qquad (1)$$

where $W_i(k)$ = weight on the $i_{th}$ channel after the $k_{th}$ iteration;

$\mu$ = loop gain, a variable which controls stability and rate of convergence;

$$\phi_i(k) = \int_{t_k}^{t_{k+1}} x_{iff}(\xi) E(\xi) d\xi = \qquad (2)$$

correlator output of the $i_{th}$ channel after the $k_{th}$ iteration;

$x_{iff}$ = feedforward signal corresponding to the $i_{th}$ antenna element $$E(t) = \sum_{i=1}^{N} W_i(k) x_{ifb}(t) - D(t) = \text{error signal} \qquad (3)$$

$x_{ifb}$ = feedback signal corresponding to the $i_{th}$ antenna element; and $D(t)$ = desired signal.

The object of the LMS algorithm executed in the adaptive antenna of the presently preferred embodiment 10 is to minimize the error signal.

The range of values that loop gain can assume while maintaining the ability of an adaptive antenna using an LMS algorithm to efficiently cause the quantized weights to substantially converge to an optimum set of values is substantially expressed by the following inequality:

$$\left| \frac{\Delta W_j'(o)}{\phi_j(o)} \right| < \mu < \frac{1}{P} \qquad (4)$$

where $\Delta W_k'(o)$ = the smallest change in weight allowed by quantization for the $k_{th}$ antenna element with initial weight $W_k(o)$;

$\phi_k(o)$ = correlator output for the $k_{th}$ antenna element $j$ = the value of k for which $\Delta W_k'(o)$ and $\phi_k(k)$ give the smallest ratio; and $$P = \frac{1}{T} \int_{o}^{T} \sum_{i=1}^{N} x_{iff}(\xi) x_{ifb}(\xi) d\xi. \qquad (5)$$

One skilled in the art will appreciate that for a given value of loop gain, the dynamic range of signal environment power levels for which the convergence of the quantized weights occurs is circumsribed by upper and lower bounds substantially defined by inequality (4).

Equations (2) and (3) show a relationship between a correlator output, $\phi_i(k)$, and corresponding feedback and feedforward signals, $x_{ifb}$ and $x_{iff}$, respectively, and equation (5) shows a relationship between the processed (or calculated) signal environment power level, P, and the respective feedback and feedforward signals, $x_{ifb}$ and $x_{iff}$.

One will appreciate that limiting the system feedback or error signal on line 46 substantially removes the dependence of the amplitude of $x_{ifb}$ upon the amplitude of the received signals on lines 14. Thus, only the amplitudes of the diagnostic feedforward signals on lines 20, such as $x_{iff}$, depend upon the amplitude of the received signal on line 14. Furthermore, the voltage amplitude of a given feedforward signal such as $x_{iff}$ substantially varies in proportion to the square root of incident power on antenna elements 12, and, therefore, $\phi_i(k)$ and P also substantially vary in proportion to the square root of incident power on antenna elements 12.

The computer 70, however, uses the digital inverse signal on line 94 to vary the value of $\mu$ in proportion to the inverse of the square root of incident power on second antenna elements 74 or 98. Thus, from equation (1) it will be understood that varying the value of $\mu$ according to the inverse of the square root of incident power on second antenna elements 74 or 98 substantially removes the dependence of the LMS algorithm upon the signal environment power levels.

In practice, the computer 70 scales the digital inverse signal by an appropriate scaling factor. The adaptive antenna is tuned to provide a scaling factor, for example, by observing the change in the weights under controlled signal environment power level conditions. If the scaling factor is too large, the weights will vary substantially randomly in the face of jamming signals. If the scaling factor is too small, the weights will remain substantially constant in the face of jamming signals. Thus, a scaling factor should be selected which causes the weights to converge to an optimum set of values in substantially the least number of iterations.

Figure 3:
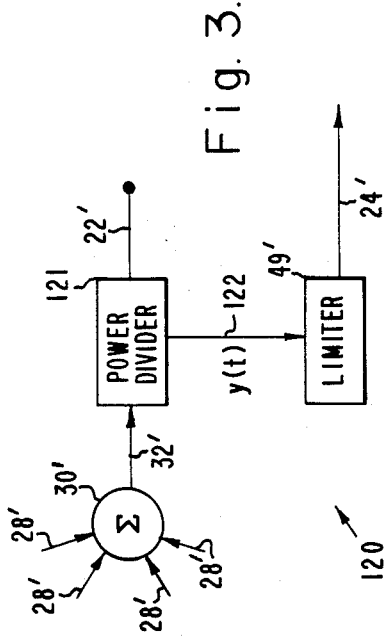
FIG. 3 is a schematic diagram of a portion of a third adaptive antenna in accordance with the present invention.

FIG. 3 illustrates a portion of a third embodiment 120 of an adaptive antenna of the present invention which is suitable for implementing the Applebaum algorithm. One skilled in the art will appreciate that the Applebaum algorithm provides a system feedback signal which is substantially proportional to the antenna output signal. Therefore, unlike adaptive antennas such as those of first and second embodiments, 10 and 96 respectively, which implement the LMS algorithm, the adaptive antenna of a third embodiment 120 does not provide a system feedback signal representing an error signal. In all other significant aspects, however, the adaptive antenna of the first embodiment 10 is substantially identical to the adaptive antenna of the third embodiment 120. Thus, only that portion of the third embodiment 120 which differs significantly from the adaptive antenna of the first embodiment 10 is illustrated in FIG. 3 and described herein. The remainder of the third embodiment 120 will be understood by reference to FIG. 1 and the written description corresponding thereto. Further, elements denoted by primed numerals in FIG. 3 correspond to identically numeralled nonprimed numerals in FIG. 1.

More specifically, the third embodiment 120 comprises a summing circuit 30' which receives weighted second signals on four respective lines 28' and which sums the signals and provides a fourth signal corresponding to the sum on line 32'. Line 32' is electrically coupled to a power divider 121 which divides the fourth signal on line 32' into two respective substantially equivalent signals on ouput line 22' and feedback line 122. Output line 22' provides an antenna output signal which corresponds to the antenna coverage pattern, similar to the output signal provided on output line 22 of the first embodiment 10, and feedback line 122 provides a system feedback signal, Y(t), to limiter 48'. The limiter 48' preferably is a hard limiter which limits the system feedback signal to approximately the amplitude level of a desired signal based upon the system requirements of the adaptive antenna. The limiter 48' provides a limited system feedback signal on line 24'.

One will appreciate, of course, that the adaptive antenna of the second embodiment 96 similarly could be modified to implement the Applebaum algorithm.

The Applebaum algorithm takes the following general form for an adaptive antenna having N antenna elements (not shown) and N corresponding first signal channels:

$$W_i(k+1) = W_i(k) - \mu\phi_i(k) + b \quad (1)$$

where $W_i(k)$ = weight on the $i_{th}$ channel after the $k_{th}$ iteration;

$\mu$ = loop gain, a variable which controls stability and rate of convergence;

$$\phi_i(k) = \int_{t_k}^{t_{k+1}} x_{iff}(\xi) Y(\xi) d\xi = \quad (2)$$

correlator output of the $i_{th}$ channel after the $k_{th}$ iteration;

$x_{iff}$ = feedforward signal corresponding to the $i_{th}$ antenna element $$Y(t) = \sum_{i=1}^{N} W_i(k) x_{ifb}(t) = \text{system feedback signal;} \quad (3)$$

$x_{ifb}$ = feedback signal corresponding to the $i_{th}$ antenna element; and b = steady state weight value.

The implementation of the Applebaum algorithm by the antenna of the third embodiment 120 will be understood by those skilled in the art.

The adaptive antenna of the third embodiment 120 realizes substantially the same relatively wide range of signal environment power levels over which respective quantized weights will substantially converge to an optimum set of values as do the adaptive antennas of the first and second embodiments, 10 and 92 respectively.

Furthermore, one skilled in the art will appreciate that further modifications can be introduced to the respective first, second and third embodiments 10, 96 and 120 disclosed herein without departing from the spirit and scope of the invention. For example, the respective first antenna elements 12 may comprise feed horns feeding a parabolic reflector and forming a multiple beam antenna coverage pattern in which each first antenna element 12 respectively, detects electromagnetic signals emanating from a substantially different region of the far field.

Finally, one skilled in the art will appreciate that the antenna of the present invention will implement other types of steepest descent algorithms such as the null steering algorithm or the sidelobe canceller algorithm.

Therefore, it is intended that the scope of the invention not be limited by the above description of a preferred embodiment of the invention, but rather that the scope of the invention be defined by the appended claims in which:

What is claimed is:

1. An adaptive antenna comprising:
   at least two first sensors for receiving electromagnetic signals from a far filed and for producing respective first signals;
   first divider means for dividing each first signal into a respective second and a respective third signal;
   means for modifying each respective second signal according to a quantized variable weighting function;
   means for summing said modified second signals to provide a fourth signal;
   means for providing a system feedback signal in response to said fourth signal;
   means for limiting said system feedback signal to prevent the feedback signal amplitude from exceeding a predetermined value;
   means for correlating said respective third signals with said limited system feedback signal to produce respective correlator output signals;
   means for determining the signal power level of the field sensed by said at least two sensors and for providing a fifth signal substantially corresponding to $1/\sqrt{P}$, whrein F is the signal power level of the far field; and
   means for executing an algorithm utilizing the correlator output signals and said fifth signal and also for modifying said variable weighting function in response to said correlator output signals and said fifth signal and thereby substantially removing the dependence of the algorithm upon the signal power level.

2. The antenna of claim 1 wherein said system feedback signal is provided in response to said fourth signal and a desired signal.

3. The adaptive antenna of claim 2 further comprising second divider means for dividing said fourth signal between an antenna output signal and an input signal to said feedback signal providing means.

4. The antenna of claim 2 wherein said means for producing an system feedback signal comprises means for substantailly removing a desired frequency band from the fourth signal operatively connected to said summing means and said limiting means so that the system feedback signal input to said limiting means has substantially no energy in said desired frequency band.

5. The antennas of claim 1 further comprising analog to digital conversion means for converting said correlator output signals from analog to digital signals.

6. The adaptive antenna of claim 1 wherein said means for providing a system feedback signal includes divider means for dividing said fourth signal between an antenna output signal and said feedback signal.

7. The antenna of claim 1 further comprising third divider means for dividing said limited system feedback signal to provide a respective limited feedback signal corresponding to each respective antenna element.

8. The antenna of claim 1 wherein said each of at least two sensors inlcudes means for sensing a substantially different region of a far field.

9. The antenna of claim 1 wherein each of said at least two sensors include means for sensing substantially the same region of a far field.

10. A method for adaptive receiving of electromagnetic signals providing for the substantial cancellation of interfering signals comprising the steps of:
   detecting electromagnetic signals and producing at least two first signals having relative phase and amplitude relationships dependent upon the direction of sources of the detected signals;
   dividing the first signals into second and third signals;
   modifying each second signall by a variable quantized weighting function;
   summing the modified second signals to provide a fourth signal;

providing a system feedback signal based upon said fourth signal;

limiting the feedback signal to prevent the signal amplitude from exceeding a predetermined value;

correlating the limited feedback signal with the third signals to provide correlator output signals;

deterining a signal power level of a field including said detected signals and for providing a fifth signal substantially coresponding to $1/\sqrt{P}$, where P is proportional to the signal power level in the far field including the detected signals;

executing an algorithm utilizing the correlated output signals and the fifth signal; and modifying the weighting function based upon the correlation of said limited feedback signal and the correlated output signals and said fifth signal.

11. The method of claim 10 wherein the system feedback signal is provided based upon the fourth signal and a desired signal.

12. The method of claim 10 wherein the step of providing a system feedback signal further comprises the step of substantially removing a desired frequency band from said fourth signal.

13. The method of claim 10 further comprising the step of converting said correlator output signals from analog to digital signals.

14. The method of claim 10 wherein the step of producing a system feedback signal from said fourth signal includes the steps of dividing said fourth signal between an antenna output signal and said feedback signal.

* * * * *